US010111168B2

(12) United States Patent
Johansson et al.

(10) Patent No.: US 10,111,168 B2
(45) Date of Patent: Oct. 23, 2018

(54) USER EQUIPMENT ENHANCEMENT FOR DIVERSE DATA APPLICATION

(71) Applicant: MEDIATEK, INC., Hsin-Chu (TW)

(72) Inventors: Per Johan Mikael Johansson, Kungsangen (SE); Chia-Chun Hsu, New Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 769 days.

(21) Appl. No.: 13/871,226

(22) Filed: Apr. 26, 2013

(65) Prior Publication Data

US 2013/0294307 A1 Nov. 7, 2013

Related U.S. Application Data

(60) Provisional application No. 61/641,714, filed on May 2, 2012.

(51) Int. Cl.
*H04W 52/02* (2009.01)
*H04W 76/28* (2018.01)

(52) U.S. Cl.
CPC ... *H04W 52/0209* (2013.01); *H04W 52/0216* (2013.01); *H04W 76/28* (2018.02); *Y02D 70/1242* (2018.01); *Y02D 70/1262* (2018.01); *Y02D 70/24* (2018.01); *Y02D 70/25* (2018.01)

(58) Field of Classification Search
CPC .................. H04W 52/0209; H04W 52/0216
See application file for complete search history.

(56) References Cited

U.S. PATENT DOCUMENTS

| | | | |
|---|---|---|---|
| 2004/0259542 A1 | 12/2004 | Viitamake et al. | 455/426.2 |
| 2007/0291673 A1 | 12/2007 | Demirhan et al. | 370/311 |
| 2008/0101268 A1 | 5/2008 | Sammour et al. | 370/311 |
| 2008/0181127 A1 | 7/2008 | Terry et al. | 370/252 |

(Continued)

FOREIGN PATENT DOCUMENTS

| | | |
|---|---|---|
| CN | 101296484 A | 10/2008 |
| CN | 101361298 A | 2/2009 |

(Continued)

OTHER PUBLICATIONS

Japan IPO, Office Action for the JP patent application 2015-509291 dated Nov. 18, 2015 (8 pages).

(Continued)

*Primary Examiner* — Feben Haile
(74) *Attorney, Agent, or Firm* — Oblon, McClelland, Maier & Neustadt, L.L.P.

(57) ABSTRACT

Methods for UE enhancements for diverse data application are disclosed. In one embodiment of the invention, the UE applies a discontinuous reception (DRX) or discontinuous transmission (DTX) operation in a wireless network. The UE detects one or more predefined traffic conditions. Based on the detected traffic conditions, the UE either stays in the long DRX state longer or extends the short DRX cycle timer. In other embodiments of the invention, the UE configures an idle mode trigger condition. The UE detects one or more predefined traffic condition. Based on the detected traffic conditions, the UE may restart the inactivity timer. In other embodiments of the invention, the UE detects one or more predefined traffic conditions. The UE adaptively adjusts RLF triggering parameters based on the detected traffic conditions.

7 Claims, 10 Drawing Sheets

(56) References Cited

U.S. PATENT DOCUMENTS

| | | | | |
|---|---|---|---|---|
| 2008/0186892 | A1 | 8/2008 | Damnjanovic | 370/311 |
| 2008/0248840 | A1* | 10/2008 | Kim | H04W 52/0216 455/574 |
| 2009/0180414 | A1 | 7/2009 | Maeda et al. | 370/311 |
| 2010/0246591 | A1 | 9/2010 | Gobriel et al. | 370/412 |
| 2012/0257522 | A1* | 10/2012 | Adachi | H04W 76/048 370/252 |
| 2013/0003577 | A1* | 1/2013 | Gupta | H04W 52/0225 370/252 |
| 2013/0260740 | A1* | 10/2013 | Rayavarapu | H04W 76/046 455/422.1 |

FOREIGN PATENT DOCUMENTS

| | | |
|---|---|---|
| CN | 101473561 A | 7/2009 |
| CN | 101473563 A | 7/2009 |
| CN | 101611648 | 12/2009 |
| CN | 101656978 | 2/2010 |
| CN | 101682888 A | 3/2010 |
| CN | 101682888 A | 3/2010 |
| CN | 101854294 | 10/2010 |
| EP | 1473951 | 11/2004 |
| EP | 2090124 | 8/2009 |
| EP | 2127420 | 12/2009 |
| EP | 2157830 | 2/2010 |
| EP | 2415306 | 2/2012 |
| JP | 2010050969 | 3/2010 |
| JP | 2010508704 | 3/2010 |
| JP | 2010508704 A | 3/2010 |
| JP | 2010517481 | 5/2010 |
| JP | 2010517481 A | 5/2010 |
| JP | 2012519457 A | 8/2012 |
| KR | 20090084884 | 8/2009 |
| KR | 20090115180 | 11/2009 |
| KR | 20110132426 | 12/2011 |
| WO | WO2008057296 | 5/2008 |
| WO | WO2008094681 | 8/2008 |
| WO | WO2010117522 | 10/2010 |
| WO | 2010/150152 A1 | 12/2010 |
| WO | WO2011028072 A2 | 3/2011 |

OTHER PUBLICATIONS

JPO, Office Action Summary for the JP patent application 2015-509291 dated Sep. 6, 2016 (5 pages).

EPO Search Report for the EP patent application 13785074.9 dated Sep. 10, 2015 (7 pages).

International Search Report and Written Opinion of International Search Authority for PCT/CN2013/074874 dated Aug. 1, 2013 (12 pages).

Chinese Office Action issued in Chinese Application No. 201380019882.X dated Jul. 19, 2018.

* cited by examiner

USER EQUIPMENT ENHANCEMENT FOR DIVERSE DATA APPLICATION

CROSS REFERENCE TO RELATED APPLICATIONS

This application claims priority under 35 U.S.C. § 119 from U.S. Provisional Application No. 61/641,714, entitled "UE Enhancement for Diverse Data Application," filed on May 2, 2012, the subject matter of which is incorporated herein by reference.

TECHNICAL FIELD

The disclosed embodiments relate generally to mobile communication networks, and, more particularly, to UE enhancement for diverse data applications.

BACKGROUND

Mobile data is growing at an astounding rate, both in terms of mobile subscribers as well as mobile data traffic. The exponential growth of mobile data requires substantial increase of network capacity and network efficiency. Currently, the existing third generation (3G) mobile network faces network congestion problem, resulting in failed calls, lower data rates and slow response times, in numerous markets. Concurrent with the data traffic growth, the rapid uptake of Smartphone subscribers, such as iPhone, Android phone and Blackberry phone users, have put additional pressure on the mobile network, due to the support of true always-on features. The always-on feature creates several problems. First, many of the always-on features generate frequent traffic, such as keep alive and status update. Second, it significantly increases signaling in the network, due to frequent context establishment and release. Third, it negatively affects user devices' battery life. Fourth, the overhead to support the always-on feature is very large compare to its data payload.

Long Term Evolution (LTE) is an improved universal mobile telecommunication system (UMTS) that provides higher data rate, lower latency and improved system capacity. In the LTE system, an evolved universal terrestrial radio access network includes a plurality of base stations, referred as evolved Node-Bs (eNBs), communicating with a plurality of mobile stations, referred as user equipment (UE). A UE may communicate with a base station or an eNB via the downlink and uplink. The downlink (DL) refers to the communication from the base station to the UE. The uplink (UL) refers to the communication from the UE to the base station. The LTE system is better adapted from the beginning to handle always-on traffic. For example, the LTE system supports longer sleep modes in connected mode, dynamic capacity in physical layer control channel and flexibility in extending core network signaling capacity by Mobility Management Entity (MME).

Despite the improvements in the LTE system, it still faces capacity and efficiency problems. For example, mobile network operators always prioritize real-time voice traffic over data traffic. Resources are held in reserve across the network for circuit-switched voice traffic. New wireless data network, such as 3G and LTE network, also optimizes support for large amount of data traffic, such as video conferencing. Such design, however, does not work well for applications with short, infrequent data sessions, such as chatty applications and keep alive messages. Many common applications such as news, weather, and social networking, periodically connect and disconnect to/from the network for updates. These applications contain small amount of user data while still require a large amount of signaling traffic to establish and tear down the session. It is estimated that with the growing number of Smartphone applications over the network, the signaling overhead outpaces the data traffic by 30% to 50%, if not higher. These applications create large control overhead and signaling load. UE battery life also becomes a major concern, because the frequent background traffic is not optimized for battery consumption. Further, although UE long sleep cycles help to increase UE battery life, it does not work very well for network-controlled handover. When the UE is in long sleep cycle, it does not perform mobility measurements. The network ends up with less accurate measurement to make assistance efficiently in preparing handover for the UE.

The first issue relates to discontinuous reception (DRX) or discontinuous transmission (DTX) transitions. In 2G and 3G, the UE uses discontinuous reception (DRX) in idle state to increase battery life. The LTE system has introduced DRX in the connected state. Long DRX in the connected state helps to improve battery life and reduces network signaling overhead. However, the connected state DRX in current LTE does not give any traffic shaping benefits in the uplink. Although traffic shaping is available for downlink in connected state DRX, it is defined rigidly. The traffic shaping does not consider any information about traffic type or UE state. Such design limits the benefit of the connected mode dormancy feature.

The second issue relates to UE going into idle mode transition. Similar network inefficiency problems in the LTE system are related to transitioning into idle state. There are two radio resource control (RRC) states, namely, RRC IDLE state and RRC CONNECTED state. Currently, the transition from the RRC CONNECTED state to RRC IDLE state is controlled by the network. The main purpose to transition into RRC IDLE state is for power saving. However, the RRC state transition incurs large signaling overhead. Further frequent RRC state changes may also impose significant more use of system resource, resulting in increased signaling overhead in the network. For some application traffic, the current RRC state transition design may counteract the power saving and/or system efficiency.

The third issue relates to UE measurement report and radio link failure (RLF) detection. One problem in the current LTE system is that the UE measurement and measurement report triggering are rigid. They are not adapted to the UE traffic types, such as background traffic, power-saving or non-power-saving state. Further, the UE considers RLF to be detected upon physical layer problems based on a procedure of N310/N311/T310, random access problem indication from MAC layer, and indication from radio link control (RLC) layer that the maximum number of retransmission has been reached. Once RLF is detected, the UE gathers and stores RLF information and attempts RRC connection reestablishment. If such attempt fails, the UE goes back to RRC IDLE state. Therefore, once UE considers RLF is detected, it will invoke a series of costly procedures. The current RLF triggering does not consider the traffic type, such as background traffic, power-saving or non-power-saving state. This could result in prematurely declaring RLF and trigger non-access stratum (NAS) recovery that follows a failed RRC re-establishment, which generates additional core network signaling.

Solutions are sought.

SUMMARY

Methods for UE enhancements for diverse data application are disclosed. In one embodiment of the invention, the UE applies a discontinuous reception (DRX) or discontinuous transmission (DTX) operation in a wireless network, where the UE is either in a long DRX state or a short DRX state. The notation that the UE is in long DRX state is equivalent to the UE using a long DRX cycle with long sleep periods, and the notation that the UE is in short DRX state is equivalent to the UE using a short DRX cycle with short sleep periods. The UE sends or receives data transmission. The UE detects one or more predefined traffic conditions. Based on the detected traffic conditions, the UE performs a DRX transition. In one embodiment of the invention, the UE stays in the long DRX state instead of the transition into the short DRX state when one or more predefined traffic condition is detected. In another embodiment of the invention, the UE extends the duration in short DRX when detecting one or more of the predefined traffic condition. In yet another embodiment of the invention, the UE send the traffic condition information to the network and performs DRX transition upon receiving network DRX transition command, wherein the network command is based on the traffic condition.

In other embodiments of the invention, the UE configures an idle mode trigger condition. The UE detects one or more predefined traffic condition. The UE performs an idle mode transition action based on the traffic condition and transits into idle mode when the trigger condition is met. In one embodiment of the inventions, the UE restarts the inactivity timer when one or more predefined traffic conditions are detected. In another embodiment of the invention, the UE send idle mode assistance information based on the traffic conditions to the network. The network sends idle mode command message to the UE. The UE goes into idle state upon receiving the network command message.

In other embodiments of the invention, the UE detects one or more predefined traffic conditions. The UE adaptively adjusts RLF triggering parameters based on the predefined traffic conditions.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
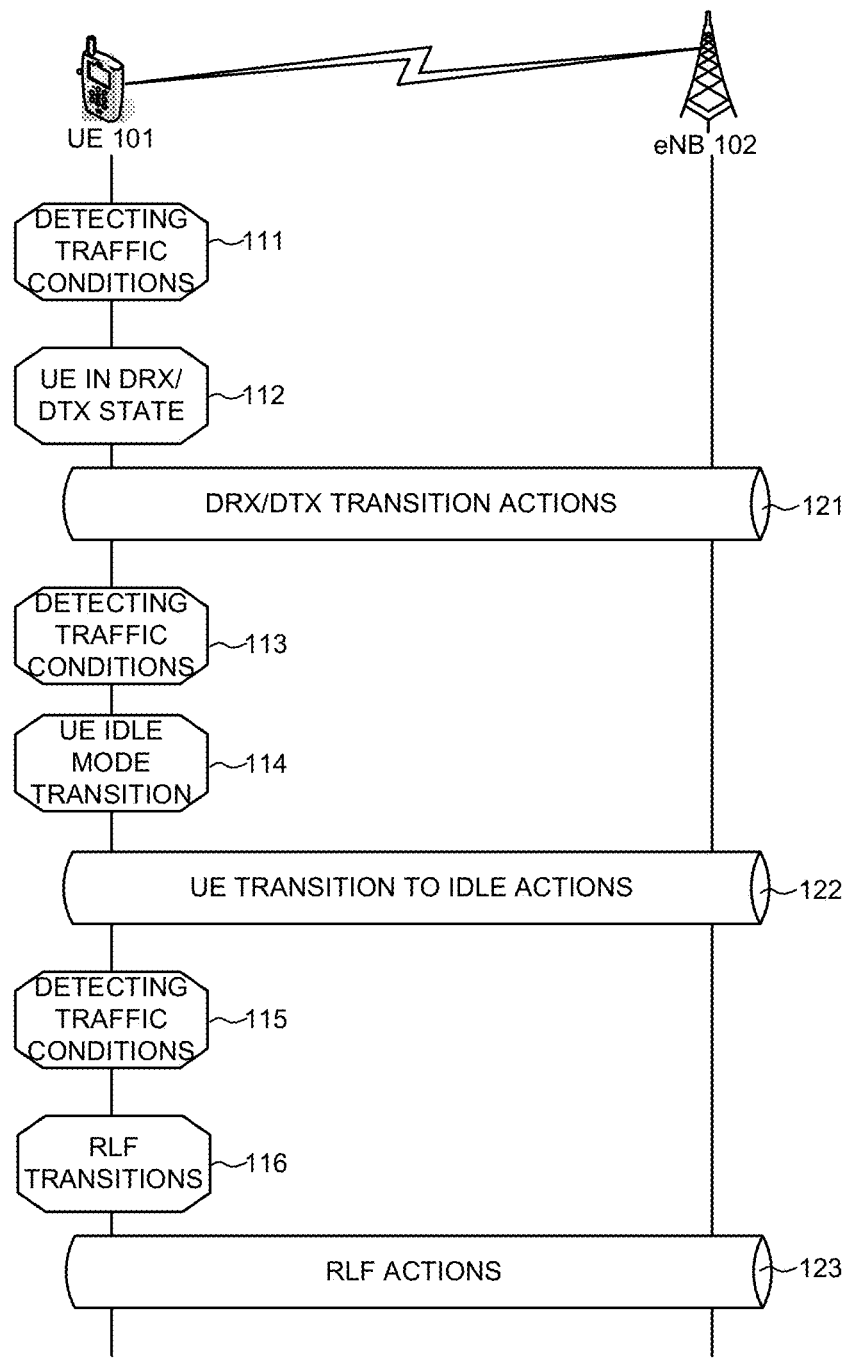
FIG. 1 schematically shows a top-level flow chart in accordance with embodiments of the current invention.

FIG. 1 schematically shows a top-level flow chart in accordance with embodiments of the current invention. A wireless network comprises a user equipment UE 101 that connects with a base station eNB 102. In accordance with one novel aspect, UE 101 performs a dynamic DRX transition action based on one or more traffic conditions. It is objective of the current invention to provide solutions to perform traffic shaping for UL. Further, the current invention provides solutions to adjust UE dormancy parameters dynamically based on other factors, such as traffic type, power-saving or non-power-saving states, etc. The power-saving or non-power-saving states can be closely represented by power-saving state or non-power-saving state, respectively. When the user is in interactive mode, the UE would normally be in non-power-saving state with screen on. When the user is in non-interactive state, the UE would go into power-saving mode with screen off. Thus the notations non-interactive state and power saving mode/state are considered equivalent, and the notations interactive state and non-power-saving mode/state are considered equivalent. Whether the UE is in such mode or state can be signaled from the UE to the network, the UE indicating a preference for power saving or not. With additional scenarios and parameters putting in the dormancy algorithm, the UE can stay in the sleep longer without any user quality of service (QoS) impacts. It can further reduce control overhead and improves UE sleep efficiency. In the example of FIG. 1, at step 111, UE 101 detects traffic conditions. At step 112, UE 101 enters DRX state. The DRX state can be either a long DRX state or a short DRX state. At step 121, UE 101 performs DRX/DTX transition actions based on the traffic condition.

Another novel aspect of the current invention involves UE in the connected state to idle state transition. The state transition is optimized by applying knowledge of traffic type, DRX state, power-saving or non-power-saving state and other parameters that can be collected by the UE to assist state transition. The current invention provides a solution to reduce the control overhead by reducing signaling for the idle mode transition and to avoid premature transition to idle mode. In the example of FIG. 1, UE 101, at step 113, detects traffic conditions. At step 114, UE 101 starts an Idle mode transition. At step 122, UE 101, based on the traffic conditions, performs UE transition to Idle actions.

Another novel aspect of the current invention provides the UE with a more dynamic method in detecting RLF by considering additional information such as traffic types, power-saving or non-power-saving state. With this improved RLF procedure, the UE can delay declaring RLF when there is no impact to QoS, while still maintains a fast trigger of search for handover if the UE requires higher QoS. In the example of FIG. 1, UE 101 at step 115 detects traffic conditions. At step 116, UE 101 performs RLF transitions. At step 123, based on the traffic report, UE 101 performs RLF actions.

Figure 2:
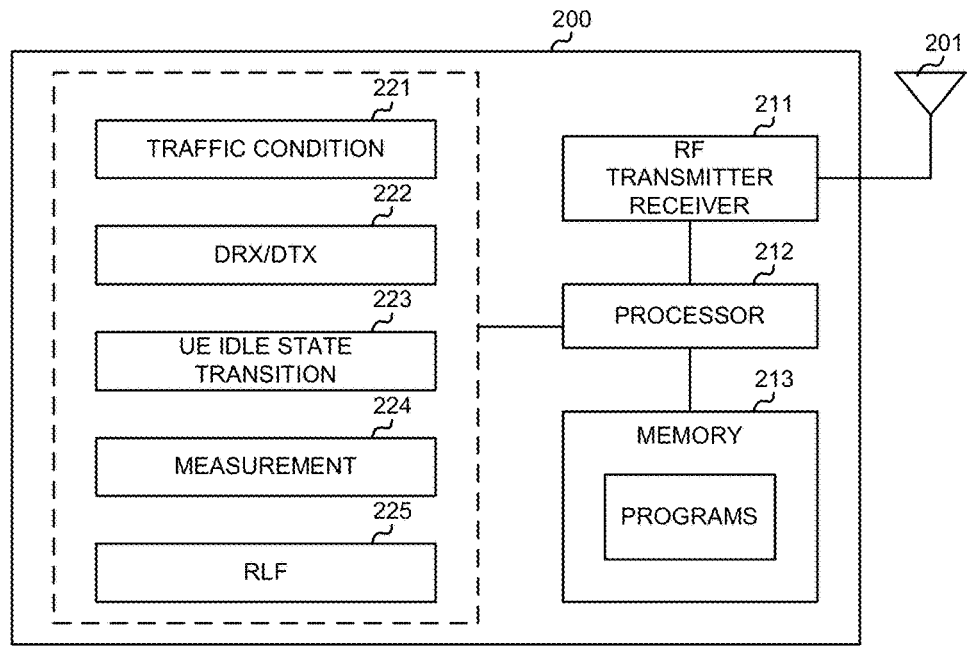
FIG. 2 shows an exemplary block diagram of a UE that supports some embodiments of the invention.

FIG. 2 shows an exemplary block diagram of a UE that supports some embodiments of the invention. The UE has RF transceiver module 211, coupled with antenna 201 receives RF signals from antenna 201, converts them to baseband signals and sends them to processor 212. RF transceiver 201 also converts received baseband signals from the processor 212, converts them to RF signals, and sends out to antenna 201. Processor 212 processes the received baseband signals and invokes different functional modules to perform features in the UE. Memory 213 stores program instructions and data to control the operations of the UE. FIG. 2 further illustrates ten functional modules 220 to 229 in the UE that carry out embodiments of the current invention. The functional modules may be implemented by hardware, firmware, software, or any combination thereof.

Traffic Condition module 221 detects traffic conditions. The current dormancy-awake decisions, like DRX state and idle state does not consider different type of traffic or activities. Some traffic types such like background traffic has less QoS requirement. There could be multiple applications running in the UE, each generates sparse background traffic. Traffic Detection Module 221 would detect these traffics and make decisions based on the condition. Another example of the traffic condition is whether the UE is active. A UE is active when there is some interaction between the user and one or applications on the UE, such as the screen is active, the application window is showing to the user, or there has been recent input by the user to the application. When a UE is active, it is likely that there will be data transmissions. Therefore, the UE may decide to stay more in awake state. Other examples are power-saving or non-power-saving state of a logical channel. If the UE is active with an application that is transmitting or receiving data, the logical channel which the data transmission is in non-power-saving state. On the other hand, if the UE in non-active or power-saving state, the data transmission can be considered to be more tolerant to delays. Therefore, when the UE in non-power-saving mode, such as the screen is off, and the background data transmission is of low QoS requirement, the UE can stay in the sleep mode longer to have better battery performance. Traffic Detection Module 221 can detect other UE conditions, such as user-plane activity level, and can further take some preconfigured information, network instruction, and other dynamic received information in deciding the traffic conditions.

DRX/DTX Module 222 handles DRX/DTX transition action. Module 222 takes in traffic conditions from Traffic Condition Module 221 and makes decisions on whether to transit into other DRX/DTX states. Based on the traffic conditions, DRX/DTX Module 222 may also dynamically change/update DRX/DTX parameters, such as short DRX cycle time and DRX Inactivity timer. UE Idle State Transition Module 223 takes in traffic conditions from Traffic Condition Module 221 and makes decisions on whether to transit from connected state to idle state. Measurement Module 224 takes in traffic condition from Traffic Condition Module 221 and makes dynamic decision as to when to send measurement report and when to do mobility measurement. RLF Module 225 takes measurement output from Measurement Module 224 and traffic conditions Traffic Condition Module 221. RLF Module 225 dynamically decides whether to declare RLF based on the measurement report and traffic conditions.

DRX/DTX Operation

Figure 3:
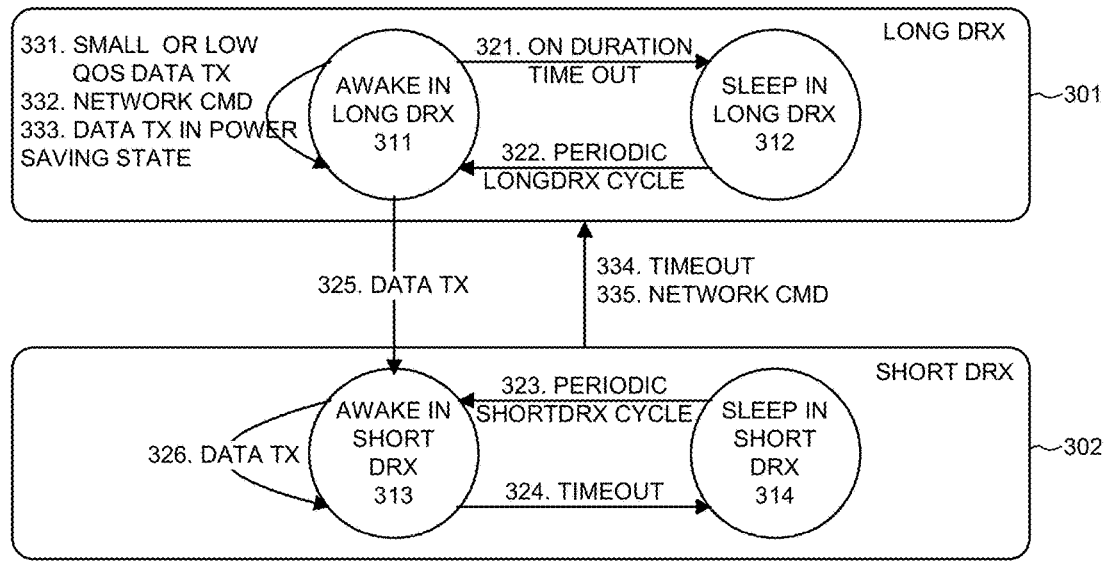
FIG. 3 schematically shows an exemplary block diagram of dynamic DRX state transitions in accordance with embodiments of the current invention.

FIG. 3 schematically shows an exemplary block diagram of dynamic DRX state transitions in accordance with embodiments of the current invention. The UE can be configured to support both long DRX, which has a longer sleep time, and short DRX, which has a shorter sleep time. Long DRX 301 has two sub-states: Awake in long DRX 311, and Sleep in long DRX 312. While the UE is in Awake in long DRX 311, the UE can receive data transmissions. An on-duration timer is running when the UE enters Awake in long DRX 311. In general, at step 321, when on-duration timer expired, the UE changes from Awake in long DRX 311 to Sleep in long DRX 312. In Sleep in long DRX 312, the UE does not receive data transmission. When the long DRX cycle timer expires, at step 322, the UE transits back to Awake in long DRX 311. Similarly, short DRX 302 has two sub-states: Awake in short DRX 313, and Sleep in short DRX 314. While the UE is in Awake in long DRX 313, the UE can receive data transmissions. An on-duration timer is running when the UE enters Awake in short DRX 313. In general, at step 324, when on-duration timer expired, the UE changes from Awake in short DRX 313 to Sleep in short DRX 314. In Sleep in short DRX 314, the UE does not receive data transmission. When the short DRX cycle timer expires, at step 323, the UE transits back to Awake in short DRX 313. At step 326, when the UE receives data transmission at Awake in short DRX 313, the UE continues to stay in Awake in short DRX 313.

The UE can transit from long DRX 301 to short DRX 302 and vice visa. At step 325, a data transmission starts. The data transmission at step 325 triggers the UE to transit from long DRX 301 to short DRX 302. On the other hand, when the UE is in short DRX 302, it can transit to long DRX 301. At Step 334, when the short DRX cycle timer expires, the UE transit from short DRX 302 to long DRX 301. Alternatively, at step 335, when the UE receives a network command instructing the UE to go to long DRX state, the UE transits from short DRX 302 to long DRX 301. Traditionally, the system does not distinguish the type of data traffic, or traffic condition. Therefore, at step 325, any type of data transmission triggers the UE going from long DRX 301 to short DRX 302. In one novel aspect of the current condition, the UE detects traffic conditions, such as background traffic, power-saving or non-power-saving state, data traffic volume and other conditions. Based on such condition, the UE may decide to stay in long DRX 301. For example, at step 331, when the traffic condition indicates small or low QoS data transmission, the UE stays in Awake in long DRX 311, instead of transitioning into short DRX 302. Similarly, at step 332, the UE may receive a network command instructing it to stay in long DRX 301. The UE, upon receiving the command, stays in Awake in long DRX 311, instead of transitioning into short DRX 302. In one preferred embodiment, the network command at step 332 is based on traffic information sent from the UE. In another preferred embodiment of the invention, the network command uses MAC Control Elements (CE). Alternatively, it can be transmitted via RRC signaling. At step 333, the UE detects that the data transmission happens in the power-saving state. Upon detecting this traffic condition, the UE stays in Awake in long DRX 311, instead of transitioning into short DRX 302. The UE may consider other traffic conditions that affect the UE's dormancy-awake operation and dynamically modify the current DRX state transition accordingly.

Figure 4A:
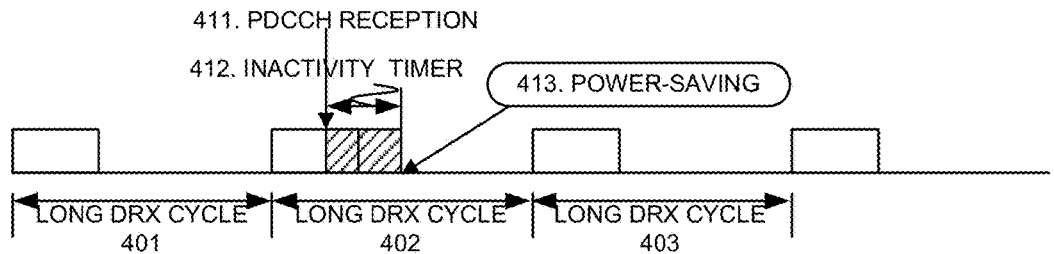
FIG. 4A shows an exemplary procedure where UE after receiving a data transmission, stays in the long DRX state based on detected traffic conditions.
Figure 4B:
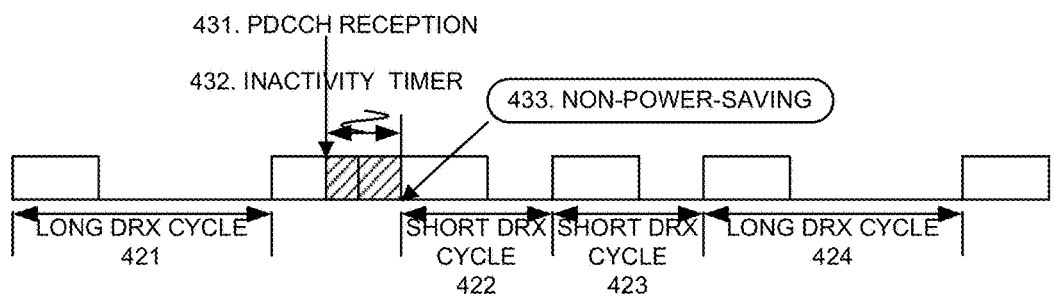
FIG. 4B shows exemplary procedure where UE after receiving a data transmission, transitions to the short DRX state based on detected traffic conditions.

FIGS. 4A and 4B shows two exemplary scenarios of a dynamically adjusted UE transition from the long DRX state to the short DRX state. In general, keeping the UE in long DRX rather than sending the UE to short DRX would increase the UE power saving due to more sleep. It would be more beneficial for traffic shaping when subsequent transmissions will be buffered until the next long DRX transmission opportunity. The main problem to stay in the long DRX state is that it might negatively affect user experience, when for example; the UE is in a highly interactive mode. Other scenarios such as bulk data transmissions, high priority/importance traffic, such as Signaling Radio Bearer (SRB) transmissions, would require a short DRX. FIGS. 4A and 4B illustrates the scenarios where the UE stays in long DRX cycle or enters short DRX cycle based on traffic conditions.

FIG. 4A shows an exemplary procedure where the UE after receiving a data transmission, stays in the long DRX state based on detected traffic conditions. The UE enters long DRX state. At long DRX cycle 401, there is no data transmission received in the on-duration. The UE, however, monitors the traffic condition. During the on-duration of long DRX cycle 402, the UE receives Physical Downlink Control Channel (PDCCH) transmission at step 411. Upon receiving the data transmission, the UE starts inactivity timer at step 412. Traditional, upon the timer expires the UE would enter into short DRX state. In one embodiment of the current invention, at step 413, the UE detects traffic condition indicating that the UE or the logical channel the 411 data transmission was using is in non-interactive or power-saving mode. Therefore, the UE stays in long DRX state and enters long DRX cycle 403. Other detected traffic conditions can also make the UE to decide to stay in the long DRX state. Examples of such traffic conditions include background traffic condition, short and non-time sensitive traffic, and small traffic volumes.

FIG. 4B shows exemplary procedure where the UE after receiving a data transmission, transitions to the short DRX state based on detected traffic conditions. The UE enters long DRX state. At long DRX cycle 421, there is no data transmission received in the on-duration. The UE, however, monitors the traffic condition. During the on-duration of long DRX cycle 422, the UE receives PDCCH transmission at step 431. Upon receiving the data transmission, the UE starts inactivity timer at step 432. At step 433, the UE detects that either the UE or the logical channel the 431 data transmission was using is in interactive or non-power-saving mode. Therefore, the UE transits into short DRX cycles and enters short DRX cycle 422. The UE did not receive data transmission during on duration in short DRX cycle 422. The UE then enters short DRX cycle 423. The UE did not receive data transmission during on duration in short DRX cycle 423. Upon short DRX cycle timer expires, the UE goes into long DRX cycle 424. In one embodiment of the current invention, the UE changes from long DRX state to short DRX state when there is data transmission and at least one of the following traffic condition detected. The first is when the data transmission or buffered data for transmission exceeds a predefined threshold. In one embodiment of the invention, for UL transmission, the transition from the long DRX to short DRX can be related to buffer status report in Buffer Status Report (BSR). The second condition is when the data transmission is for a certain logical channel or logical channel group. In one embodiment of the invention, the logical channel is a high priority channel or SRB. The third condition is when the data transmission is a specific UL or DL transmission. This is the condition when the transmission is time critical signaling procedures where a response is expected. For example, when an event triggered measurement report has been sent, the UE would expect a network radio resource management (RRM) reconfiguration or a handover in response. The fourth condition is when the UE or the logical channel/bearer is in non-power-saving mode.

Figure 5:
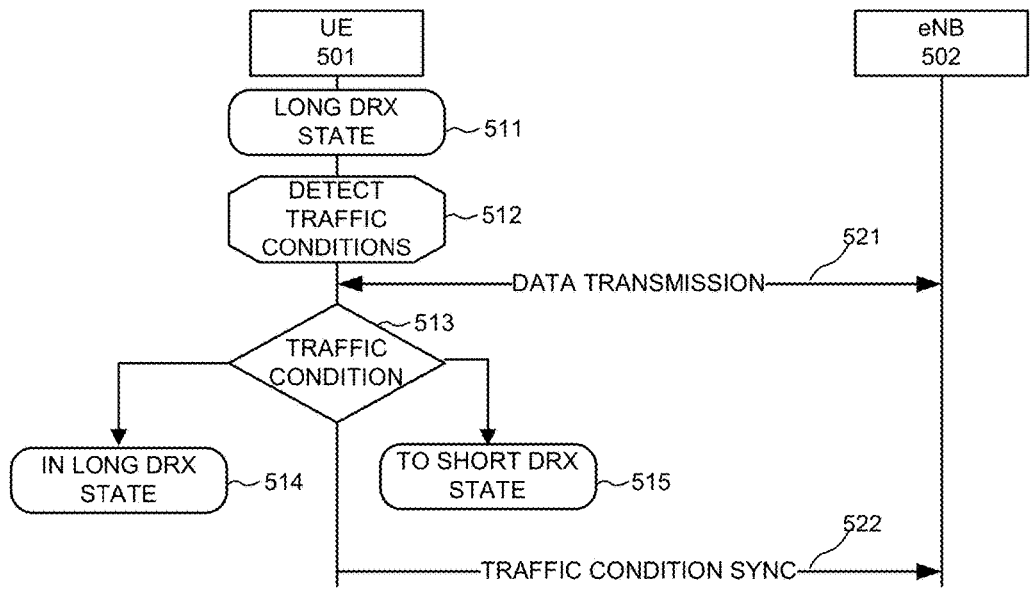
FIG. 5 is an exemplary flow chart of the dynamic transition from long DRX state to short DRX state in accordance with one embodiment of the invention.

FIG. 5 is an exemplary flow chart of the dynamic transition from long DRX state to short DRX state in accordance with embodiments of the invention. UE 501 connects with eNB 502, which connects to a wireless network. At step 511, UE 501 enters long DRX state. At Step 512, UE 502 detects traffic conditions. The exemplary traffic conditions are listed in the previous sections. It is understood by one of ordinary skills in the art that other traffic conditions can be detected by UE 501. A more delay tolerant traffic condition would indicate a benefit of staying in the long DRX state, while a more real time data transmission, or large volume of transmission, would indicate the need to transit into the short DRX state. UE 501 keeps on collecting and updating these traffic conditions. At step 521, a data transmission is detected. At step 513, UE 501 gathers the traffic condition information and compares them. UE 501, at step 513, may implement certain algorithm to evaluate various traffic conditions collected. Such algorithm can be simple decision or can be dynamically configured. UE 501 can evaluate all the collected traffic condition on an on-going basis, or periodically or when some predefined trigger events happen. Upon deciding the traffic condition, UE 501, at step 515, transits into short DRX state, if at least one of the predefined traffic conditions is met. The set of predefined traffic conditions can be preconfigured, and/or dynamically updated. If at step 513, UE does not detect any of the predefined traffic conditions, or the traffic condition at step 513 indicates a delay tolerant traffic type, UE 501 stays in long DRX state at step 514. In one embodiment of the current invention, at step 522, UE 501 sends traffic condition synchronization message to the network. This message is to indicate to the network the current UE DRX states, DRX parameter updates and/or other related traffic conditions detected by UE 501. The network can synchronize with UE 501 by either deriving the UE state through the traffic conditions it receives, or by receiving explicitly state transition information. The synchronization can be done when there is a trigger event, such as UE state change or traffic condition change, or can be updated periodically. The synchronization schemes can be configurable and dynamically adjusted.

Figure 6A:
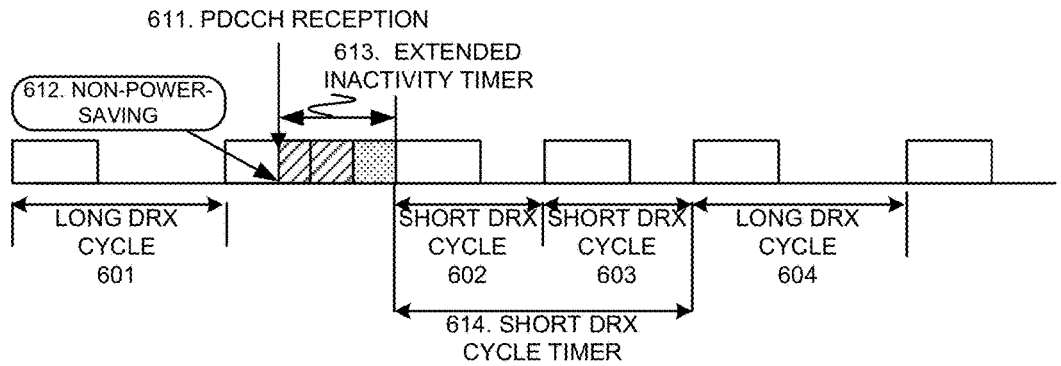
FIG. 6A shows an exemplary scenario where the inactivity timer is extended after a data transmission when the traffic condition indicates no prohibition condition exists.
Figure 6B:
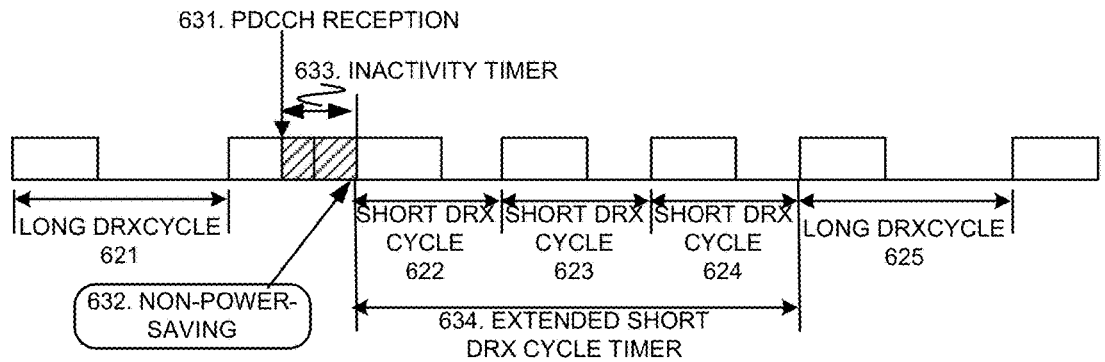
FIG. 6B shows an exemplary scenario where the short DRX cycle timer is extended after a data transmission when the traffic condition indicates no prohibition condition exists.

Another aspect of the dynamic DRX transition scheme is to dynamically adjust or extend inactivity timer and/or short DRX cycle timer. FIGS. 6A and 6B shows two exemplary scenarios when the inactivity timer and the short DRX cycle timer are extended based on traffic conditions. Though the two diagrams show implementation of one the extension, it is understood by one of ordinary skills in the art that both timers can be extended at the same time.

FIG. 6A shows, in accordance with embodiments of the current invention, an exemplary scenario where the inactivity timer is extended after a data transmission when the traffic condition indicates no prohibition condition exists. The UE enters long DRX cycle 601. There is no data transmission during its on-duration. In the next on-duration, the UE receives PDCCH data transmission at step 611. At step 612, the UE detects that either the UE or the logical channel the 611 data transmission was using is in interactive or non-power-saving mode. The UE further detects that there is no prohibition condition detected. The prohibition conditions can be preconfigured or dynamically updated. The first prohibition condition is when the data transmission or buffered data for transmission is below a predefined threshold. The second is that the data transmission is not one of the predefined logical channels or logical channel group, such as high priority channels or SRB. The third one is that the data transmission is not one of the predefined specific transmissions in the UL or DL. The fourth one is that the UE or the logical channel the 611 data transmission was using is in power-saving mode. Upon deciding that the UE meets all the conditions, the UE extended the inactivity timer at step 613. Upon expiring of the extended inactivity timer, the UE enters short DRX cycle 602, followed by short DRX cycle 603. At step 614, the regular short DRX cycle timer expires. The UE enters long DRX cycle 604.

FIG. 6B shows, in accordance with embodiments of the current invention, an exemplary scenario where the short DRX cycle timer is extended after a data transmission when the traffic condition indicates no prohibition condition exists. The UE enters long DRX cycle 621. There is no data transmission during its on-duration. In the next on-duration, the UE receives PDCCH data transmission at step 631. At step 633, the UE starts inactivity timer. Upon expiration of the inactivity timer, at step 632, the UE detects that either the UE or the logical channel the 631 data transmission was using is in interactive or non-power-saving mode. The UE further detects that there is no prohibition condition detected. The prohibition conditions can be preconfigured or dynamically updates. The prohibition events are the same as defined above. Upon deciding that the UE meets all the conditions, the UE extends the short DRX cycle timer. The UE enters short DRX cycle 622, followed by short DRX cycle 623. Because the short DRX cycle timer is extended, the UE stays in the short DRX longer by entering short DRX cycle 624. At step 634, the extended short DRX cycle timer expires. The UE enters long DRX cycle 625.

Figure 7:
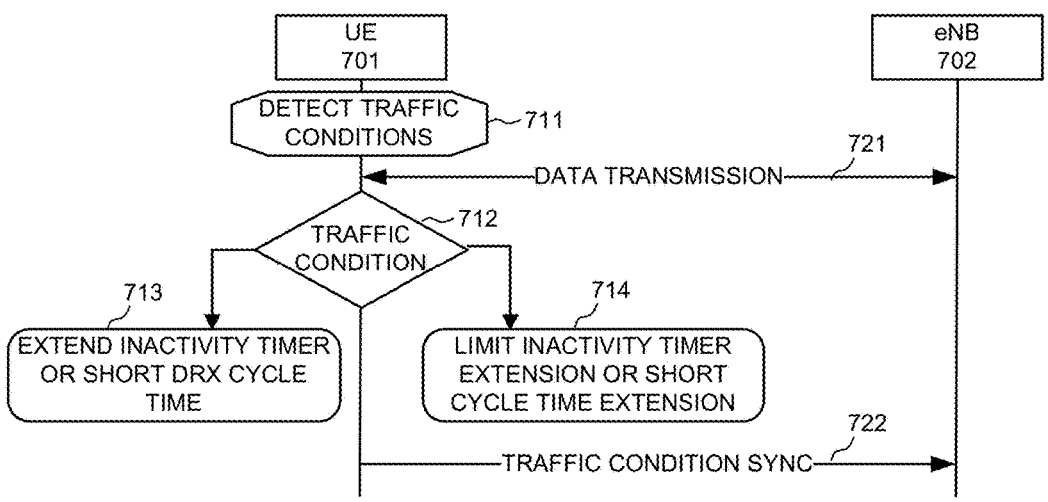
FIG. 7 shows an exemplary flow chart of the UE dynamically update DRX inactivity timer and/or short DRC cycle timer based on traffic conditions.

FIG. 7 shows, in accordance with embodiments of the current invention, an exemplary flow chart of the UE dynamically update DRX inactivity timer and/or short DRX cycle timer based on traffic conditions. UE 701 connects with eNB 702, which connects to a wireless network. At step 711, UE 701 detects traffic conditions. At step 721, UE 701 detects data transmission. At Step 712, UE 701 determines an action based on the traffic conditions. The exemplary traffic conditions are listed in the previous sections. It is understood by one of ordinary skills in the art that UE 701 can detect other traffic conditions. UE 701 keeps on collecting and updating these traffic conditions. At step 712, UE 701 gathers the traffic condition information and compares them. UE 701, at step 712, may implement certain algorithm to evaluate various traffic conditions collected. Such algorithm can be simple decision or can be dynamically configured. The traffic condition can be decided in an on-going basis, or periodically or be decided at the time that the decision is needed. Upon deciding the traffic condition, UE 701, at step 713, extends inactivity timer and/or short DRX cycle timer so that the UE stays awake longer. If the at Step 712, UE 701 decides the conditions are not met, UE 701 does not extend the inactivity timer nor the short DRX cycle timer at step 714. In one embodiment of the current invention, at step 722, UE 701 sends traffic condition synchronization message to the network. This message is to indicate to the network the current UE DRX states, DRX parameter updates and/or other related traffic condition detected by UE 701. The network can synchronize with UE 701 by either deriving the UE state through the traffic condition it receives, or by receiving explicitly state transition information. Other synchronization message can also be adopted. The synchronization can be done when there is a trigger event, such as UE state change or traffic condition change, or can be updated periodically. The synchronization schemes can be configurable and dynamically adjusted.

As shown above, dynamically adjusting UE DRX state and/or DRX parameters can be done in the UE where the traffic condition is detected. Such implementation does not involve addition messaging and the decision is local to the UE where the conditions are known. Such scheme, however, has the risk of out-of-sync between the UE and the network. As shown above, some kind of synchronization should be implemented to resolve potential out-of-sync problems. Another way to implement the dynamic DRX state transition for the UE is through network commands.

Figure 8:
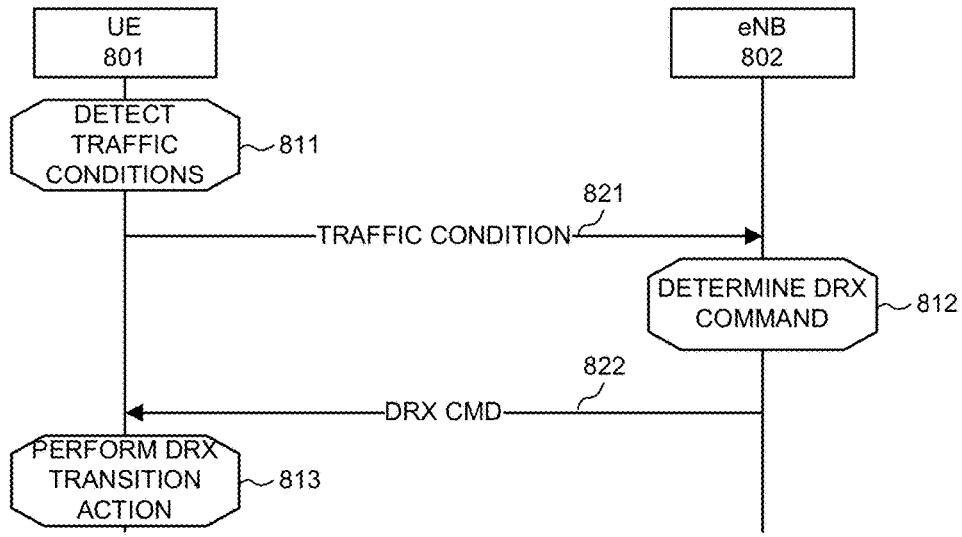
FIG. 8 shows an exemplary flow chart where the UE performs DRX state transition based on network command and the network determines the DRX commands based on the traffic conditions received from the UE.

FIG. 8 shows an exemplary flow chart in accordance to embodiments of the current invention wherein the UE performs DRX state transition based on network command, wherein, the network determines the DRX commands based on the traffic conditions received from the UE. UE 801 connects to eNB 802, which connects to a wireless network. At step 811, UE 801 detects traffic conditions. The traffic conditions may include the UE power-saving/non-power-saving state, background traffic type, user-plane activities, and other traffic type, traffic condition related information. The traffic condition can be preconfigured or can be dynamically updated and synchronized between the UE and the network. At step 821, UE 801 sends these traffic conditions to the network. The traffic condition can be sent when there is a trigger event, such as UE state change or traffic condition change, or can be updated periodically. The traffic condition can also include UL traffic tagging by providing information to the network regarding the UL data's characters, such as delay-tolerant, background traffic, power-saving or non-power-saving data. By identifying the context of the data, the network can make better decision regarding the UE DRX transitions. At step 812, upon receiving the traffic conditions from UE 801, eNB 802 determines DRX command. In one embodiment of the current invention, the determination is done in the network instead of the eNB. In other embodiments of the invention, the decision can be done by other network entities. At step 822, the network sends UE 801 DRX command. Examples of the network DRX commands include go to long DRX or stay in long DRX after this data transmission, use a predefine DRX configuration after this data transmission, use long or short or medium inactivity timer for transitioning to sleep, or use long, short medium inactivity timer to transit out of short DRX. In one preferred embodiment of the current invention, the DRX command is sent with a DL data transmission, such as in a MAC header. The command can be applied to DRX operations directly after the data transmission. The signaling overhead would be minimal. In another preferred embodiment of the current invention, some DRX action configuration is preconfigured and the command would refer to those preconfigured commands. At step 813, upon receiving the network DRX command, UE 801 performs DRX transition action accordingly.

Traditionally, traffic shaping in DRX only applies to DL. In some preferred embodiments of the current invention, the UE applies transmission dormancy in the UL. The UE is only allowed to transmit on certain occasions in the UL. The UL transmission occasion period can be set longer than the maximum Scheduling Request period. The UL transmission occasions restriction as stated above may be applicable to Physical Uplink Control Channel (PUCCH) and other contention based transmission in the UL. One issue with UL traffic shaping is the possibility of UE and network out-of-sync. To avoid out-of-sync problem between the UE and the network one end of the communication is responsible for context identification and detects other traffic conditions. Such information is subsequently signaled to the other end. For example, the UE can tag UL data by adding an information element (IE) in a MAC header, notifying the network whether this data is delay-tolerant/background traffic, or non-power-saving, or conversational. In another embodiment of the invention, the UE reports non-power-saving/power-saving state either for the logical channel or for the UE by including the information with data transmission in the UL. In another embodiment of the invention, the network can request such information and the UE would respond by sending the traffic information to the network.

Figure 9:
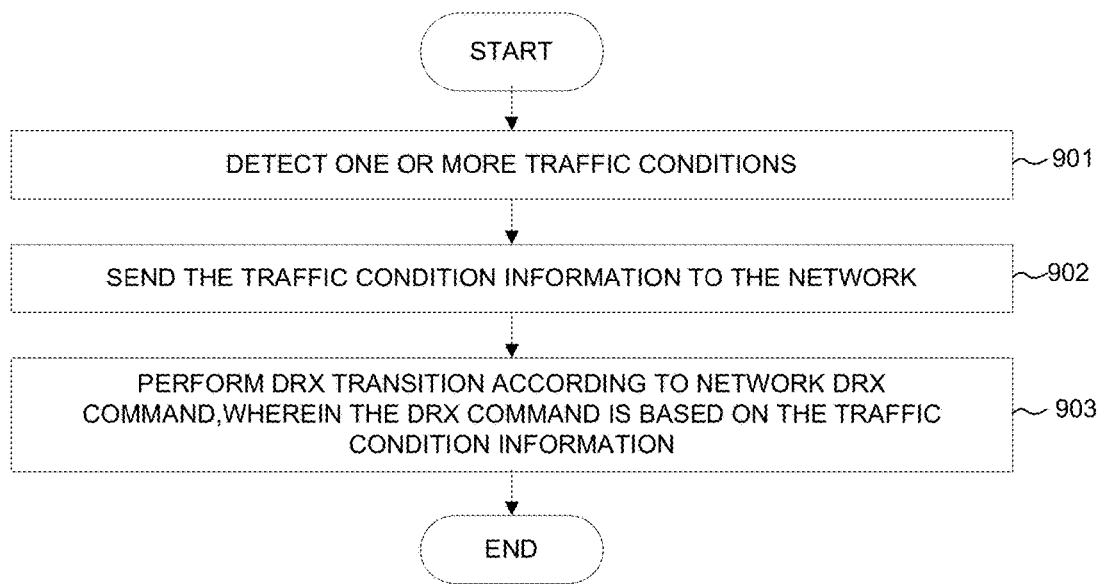
FIG. 9 is an exemplary flow chart of dynamic DRX transition according to network command in accordance with embodiments of the current invention.

FIG. 9 is an exemplary flow chart of dynamic DRX transition according to network command in accordance with embodiments of the current invention. At step 901, the UE detects one or more traffic conditions. At step 902, the UE sends the traffic condition information to the network. At step 903, the UE performs DRX transition action according to network DRX command, wherein the DRX command is based on the traffic condition information.

Figure 10:
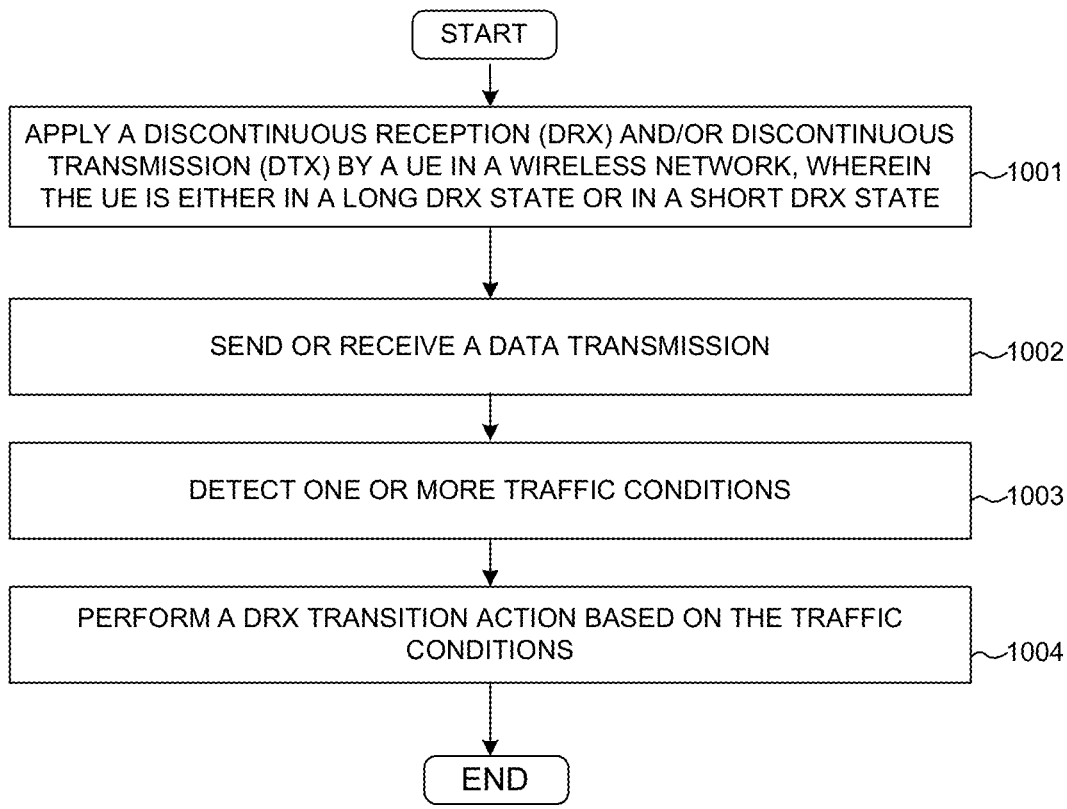
FIG. 10 is an exemplary flow chart of dynamic DRX transition based on traffic conditions detected by the UE.

FIG. 10 is an exemplary flow chart of dynamic DRX transition based on traffic conditions detected by the UE in accordance with embodiments of the current invention. At step 1001, the UE applies a discontinuous DRX or DTX in a wireless network, wherein the UE is either in a long DRX state or in a short DRX state. At step 1002, the UE sends or receives a data transmission on a logical channel. At step 1003, the UE detects one or more traffic conditions. At step 1004, the UE performs a DRX transition action based on the traffic conditions.

Idle-Connected Transition

Dynamically adjusting UE DRX state transition and/or DRX parameters based on traffic conditions improves UE battery life without impact on user experience. Another costly operation is transition into Idle state. In the current system, the Idle mode transition trigger is in the network, and explicit signaling is invoked to trigger transition to Idle. There is significant amount of overhead in getting the UE UL synchronized in order to receive RRC release command. Such overhead can be reduced if the Idle transition trigger can be dynamically adapted, taking traffic conditions on the UE into consideration.

Figure 11:
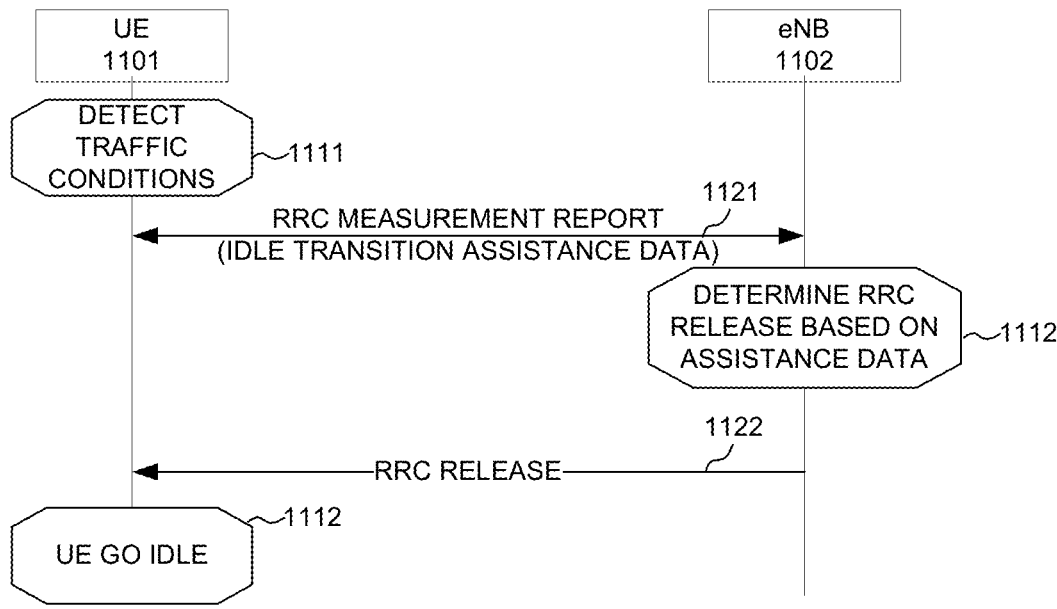
FIG. 11 shows an exemplary flow chart of an idle mode transition where idle transition assistance data is sent from UE to the network.

FIG. 11 shows an exemplary flow chart of a dynamic UE connected to idle transition in accordance with embodiments of the current invention wherein idle transition assistance data is sent from the UE to the network. UE 1101 connects with eNB 1102, which connects with a wireless network. At step 1111, UE 1101 detects traffic conditions. In one preferred embodiment of the invention, at step 1121, UE 1101 sends idle transition assistance data to the network via RRC measurement report. The assistance data can be sent to the network via other messages. The assistance data typically includes the type of traffic for actively ongoing traffic, such as background or a time pattern characterization, UE power-saving or non-power-saving state, UE dormant/awake state, such as DRX awake, transmitting or receiving state, and recent history information related to the above information. Other traffic condition information such as the moving speed of the UE can also be included in the report. The idle transition assistance data can be sent at measurement report transmission or can be transmitted when transmitting data to the network. At step 1112, eNB 1102 upon receiving the idle transition assistance data, determines whether to release RRC connection. It is understood by one of ordinary skills in the art that the decision can be made by other entities in the network. At step 1122, the network based on the received idle transition assistance data, sends RRC release message to UE 1101. Upon receiving the RRC release message, UE 1102 goes to idle at step 1112.

Another way to make the UE going to Idle state more efficiently is to apply different idle transition trigger depending on user interactivity. Specially, the UE goes to Idle state sooner rather than later when the UE is in power-saving state. Because when the user is in power-saving state, the user will not notice the additional delay. The user interactivity can be detected as UE in non-power-saving state, and can be based on transmission exceeding a predefined threshold.

Figure 12:
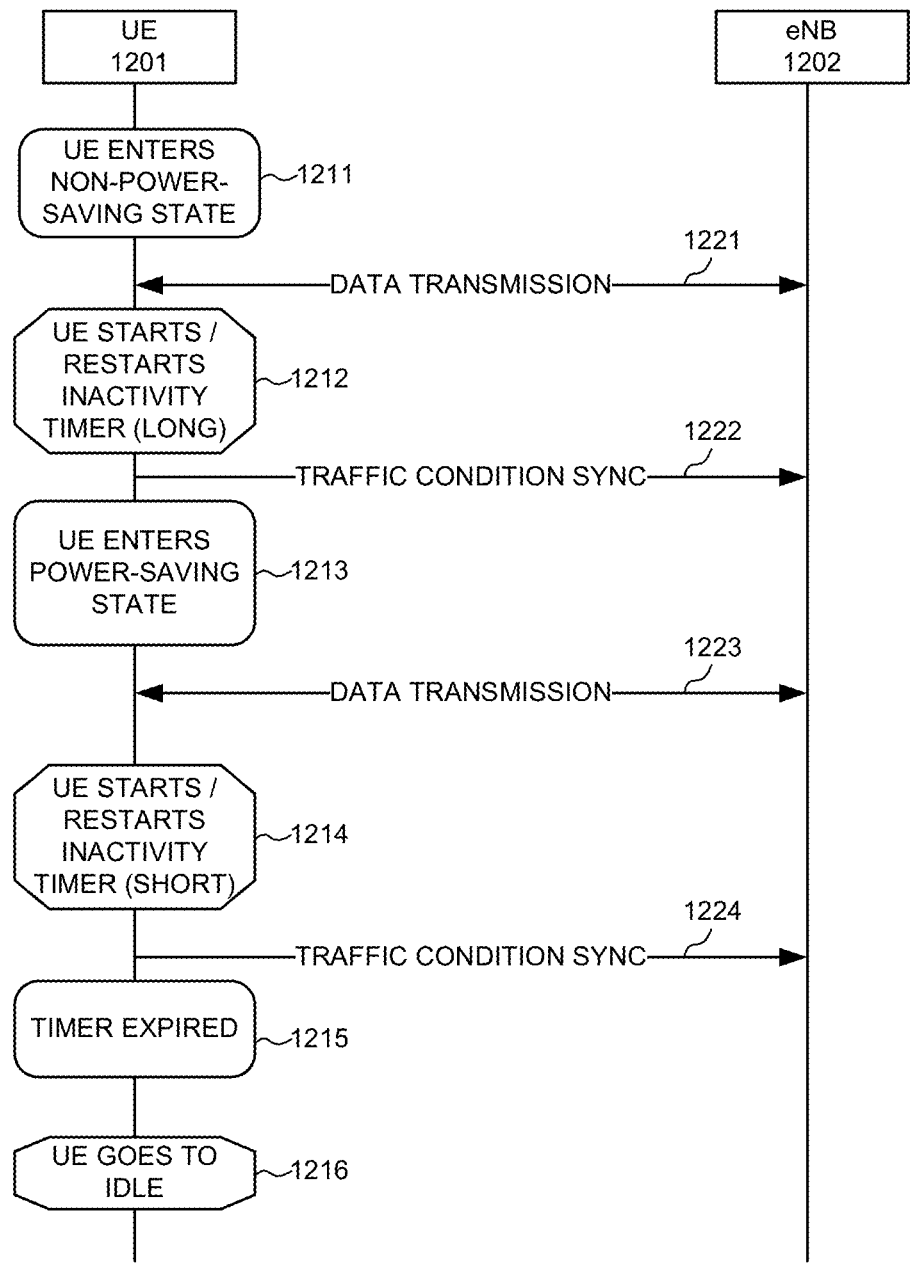
FIG. 12 shows an exemplary flow chart where UE starts or restarts inactivity timer based on traffic conditions.

FIG. 12 shows an exemplary flow chart in accordance with embodiments of the current invention wherein the UE starts or restarts inactivity timer based on traffic conditions. UE 1201 connects to eNB 1202, which connects to a wireless network. At step 1211, UE 1201 enters interactive/non-power-saving state. At step 1221, UE 1201 sends or receives data transmission. UE 1201 may also notify the network about its non-power-saving state at this step. At step 1212, UE 1201 starts inactivity timer. The idle transition timer value is set to be long. The idle transition timer value depends on at least one of a predefined group of traffic conditions. The predefined traffic conditions can be preconfigured or dynamically updated. The first traffic condition is the data volume of the data transmission that starts the timer. The second traffic condition is the type of the logical channel or bearer for the transmission that starts the timer, such as high priority channels. The third traffic condition is whether the data transmission that starts the timer is for some predefined specific the UL or DL. The fourth traffic condition is whether the UE or the logical channel of the data transmission that starts the timer is in power-saving or non-power-saving state. In one embodiment of the current invention, UE 1201 sends traffic condition synchronization message to the network at step 1222. Subsequently, at step 1213, UE 1201 enters non-interactive/power-saving state. At step 1223, UE 1201 sends or receives data transmission. In one embodiment of the invention, UE 1201 may also notify eNB 1202 about the power-saving state. At step 1214, UE 1201 starts or restarts inactivity timer and sets the timer value to be a short one. In one embodiment of the current invention, UE 1201 sends traffic condition synchronization message to eNB 1202 at step 1224. At step 1225, the inactivity timer expires. UE 1201 goes to idle state at step 1216.

Figure 13:
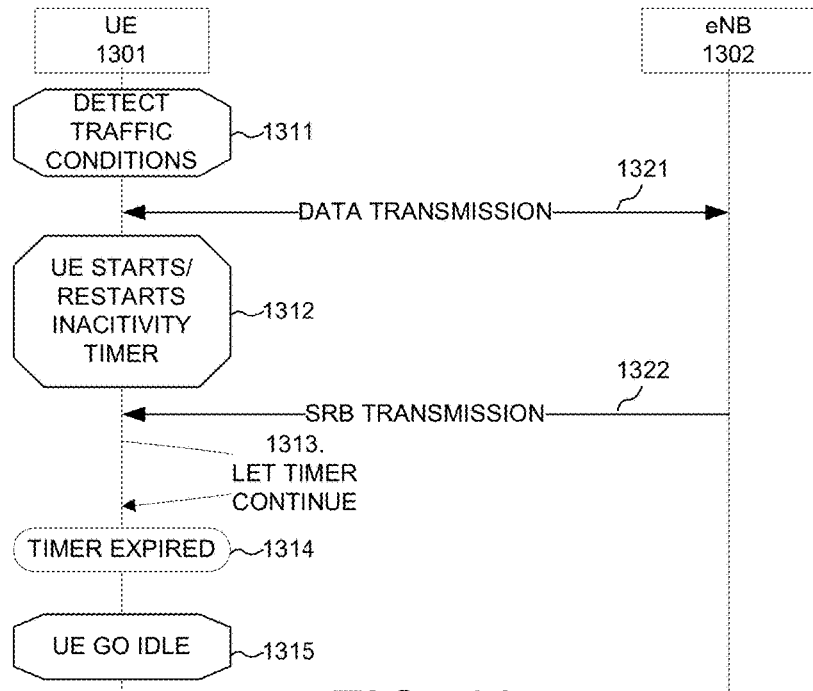
FIG. 13 shows an exemplary flow chart where the inactivity timer is not restarted based on traffic condition.

FIG. 13 shows an exemplary flow chart in accordance with embodiments of the current invention where the inactivity timer is not restarted based on traffic condition. UE 1301 is connected with eNB 1302, which is connected with a wireless network. At step 1311, UE 1301 detects traffic conditions. At step 1321, UE 1301 sends or receives data transmission. UE 1301, upon detecting data transmission, decides whether to start/restart the inactivity timer conditionally based on optional secondary conditions include: a volume of the data transmission is above a predefined threshold, the data transmission is for specific predefined logical channels or radio bearers, the data transmission is a predefined specific uplink or downlink signaling transmission, and the UE or the logical channel is in a non-power-saving state conditionally based one or more optional traffic conditions. At step 1312, UE 1301 starts or restarts inactivity timer so that the UE would stay in the connected longer to avoid costly unnecessary state transition. At step 1322, UE 1301 receives SRB transmission. Because SRB is for control plane activities, it is not related to expected UE activity in the future. Therefore, such activities should be ignored. At step 1313, UE 1301 let the inactivity timer continues without restarting it. Other traffic condition may be preconfigured or dynamically updated to identify the situations when certain event is a none-factor in UE transition into Idle state. Such event, once configured, allows UE to continue let the inactivity timer running without delaying UE's entering into Idle state. At step 1314, UE inactivity timer expired. At Step 1315, UE 1301 goes to Idle.

Figure 14:
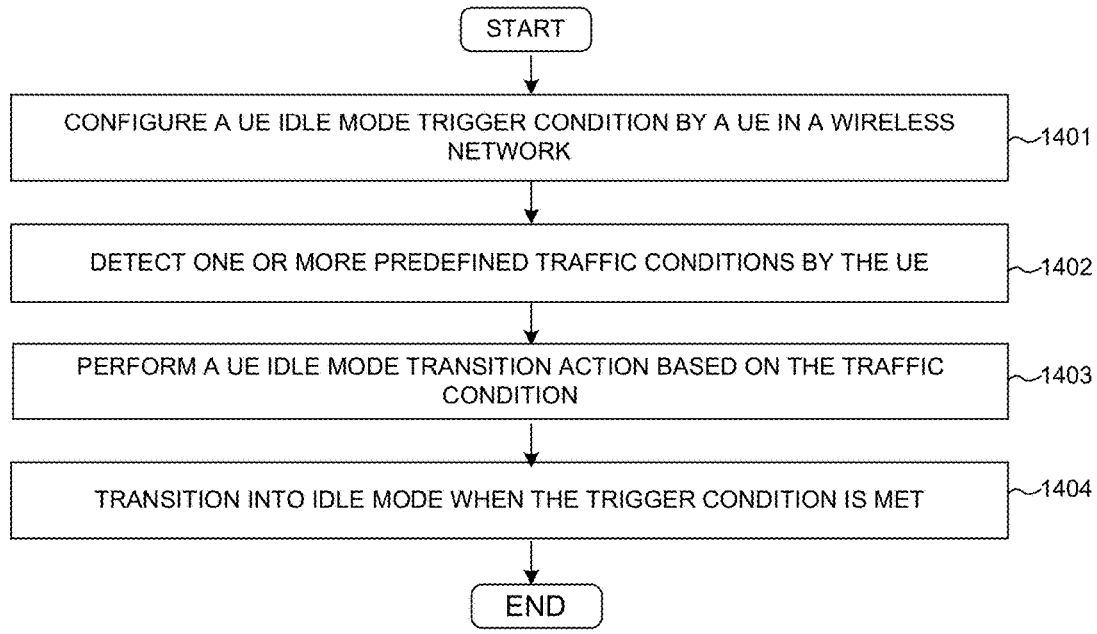
FIG. 14 shows an exemplary flow chart where UE transitions to Idle state based on one or more traffic conditions.

FIG. 14 shows an exemplary flow chart in accordance to embodiment of the current invention that UE transitions to Idle state based on one or more traffic conditions. At step 1401, the UE configures a UE idle mode trigger condition by a UE in a wireless network. At step 1402, the UE detects one or more predefined traffic conditions. At step 1403, the UE performs a UE idle transition action based on the traffic condition. At step 1404, the UE transits into Idle mode when the trigger condition is met.

Triggering of RLF and Measurement Report

By considering UE traffic conditions, UE can become more efficient without affecting user experiences in DRX state transitioning and Idle state transitioning. Other issues relate to mobility measurement report and triggering of radio link failure. Mobility measurement performance should be based on user plane activity rather than just DRX cycle. With higher user plane activity, the more measurements should be done by the UE due to UE being more active. When UE is not transmitting or receiving data, or is just transmitting or receiving background traffic, the UE could measure when the UE wakes up in the DRX cycle. However, when the UE is active due to data transmission, such as short DRX or when inactivity timer is running, the UE should also do addition mobility measurement. This improves UE mobility measurement performance when user is interactive and actively using the UE. This promotes good end-user QoS without costly battery consumption. When the UE is in deep sleep, the mobility measurement performance will deteriorate. In this case, however, the user will not notice it since it is not using the UE.

Coupled with mobility measurement, the UE should consider UE traffic condition in declaring RLF. In doing so, the UE can avoid premature RLF and ultimately avoid NAS recovery following by a failed RRC re-establishment. It is, therefore, beneficial to stay in the old cell longer. However, such approach needs to be context sensitive and the prolonged search for the old cell should not be done if there is user QoS impact. For example, if the UE is in non-power-saving state, the UE should search for the best cell and reconnect to ensure QoS.

Figure 15:
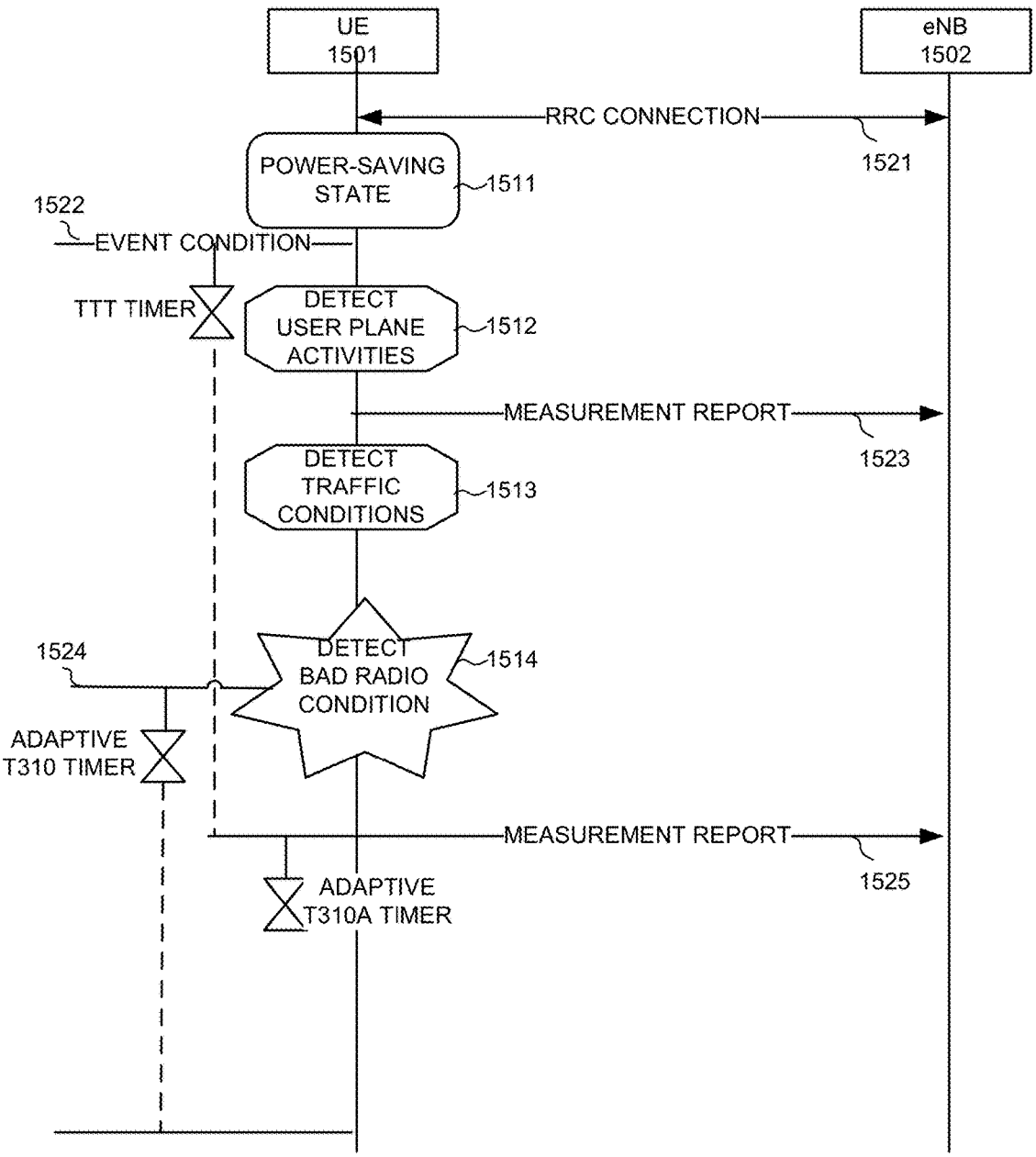
FIG. 15 shows an exemplary flow chart where UE sends measurement reports based on user plane activities.

FIG. 15 shows an exemplary flow chart in accordance with the current invention where UE sends measurement reports based on user plane activities. UE 1501 is connected with eNB 1502, which is connected with a wireless network. At step 1521, UE 1501 enters RRC CONNECTED state. At step 1511, UE 1501 detects non-interactive/power-saving state. At step 1522, an event condition is met and measurement report timer (TTT timer) is started. At step 1512, UE 1501 detects user plane activities. Once user plane activities is detected, even the TTT timer is not expired, UE 1501 sends measurement report to eNB 1502 at step 1523. At step 1513, UE 1501 detects traffic conditions that can be used to update RLF parameters dynamically. The first traffic condition is DRX state, including long DRX non-active state, short DRX non-active state and DRX active state, where DRX active state means that data transmission is ongoing. The second traffic condition is power-saving/non-power-saving state. The third traffic condition is successful delivery of measurement reports. Other traffic conditions can be tracked based on either configuration or dynamic updates by the network. Upon detecting one or more of the predefined traffic conditions, UE 1501 dynamically adjusts RLF parameters. For example, upon detecting UE 1501 is in non-interactive/power-saving state, the RLF timers can be adaptively adjusted to make the RLF happen later. For example, LTE N310 can be increased, LTE N311 can be decrease, and LTE T310 can be increased. At step 1514, UE 1501 detects bad radio condition. At step 1524, UE 1501 starts T310 timer. The value of the T310 timer, however, is an adaptive T310 timer value. The adaptive timer value is based on, at least partly on the traffic conditions detected by UE 1501. At step 1525, UE 1501 sends measurement report and starts T310A timer. The value of the T310 timer, however, is an adaptive T310A timer value. The adaptive timer value is based on, at least partly on the traffic conditions detected by UE 1501. Other RLF parameters like N310 and N311 can also be dynamically updated based on the traffic condition. The adaptive RLF parameters can be preconfigured and synchronized between the UE and the network. In one embodiment of the invention, some synchronization messages are sent from UE 1501 to eNB 1502 to synchronize the traffic conditions and other state change and parameter changes.

Figure 16:
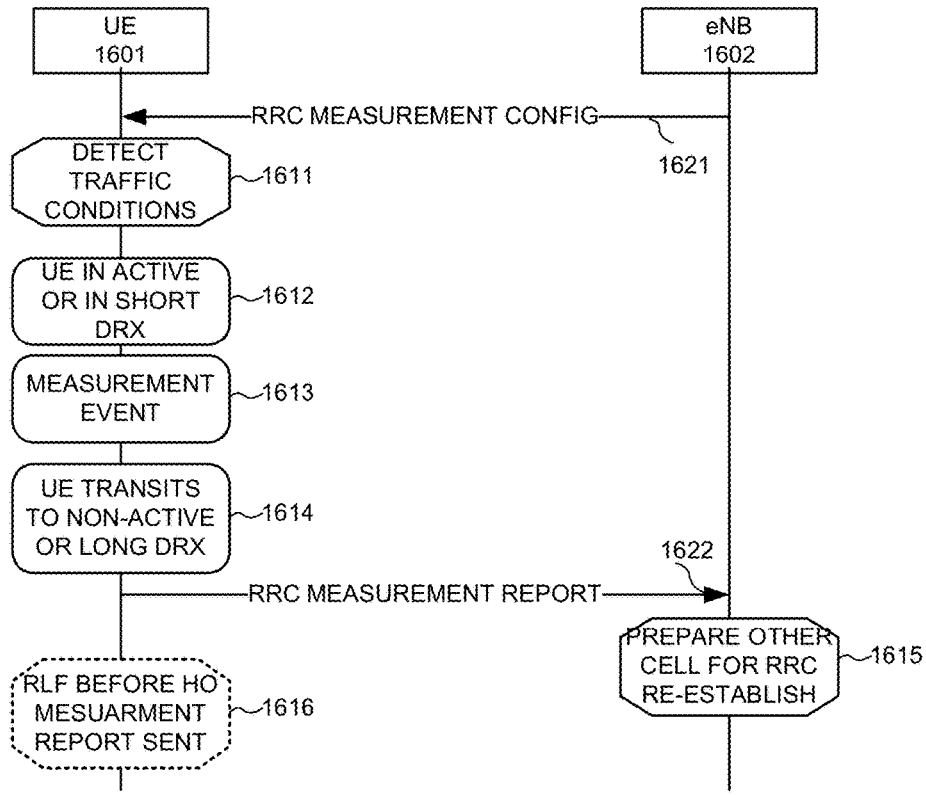
FIG. 16 shows an exemplary flow chart where UE triggers measurement report before TTT timer expires based on detected traffic conditions.

FIG. 16 shows an exemplary flow chart in accordance to embodiments of the current invention when the UE triggers measurement report before TTT timer expires based on detected traffic conditions. UE 1601 connects to eNB 1602, which connects to a wireless network. At step 1621, UE 1601 receives RRC measurement configuration message. At step 1611, UE 1601 detects traffic conditions. At step 1612, UE 1601 enters active state or short DRX state. At step 1613, UE 1601 determines that measurement event entering condition is met and TTT filtering has been done. At step 1614, UE 1601 transits to non-active or long DRX state. Subsequently, at step 1622, UE 1601 sends RRC measurement report to eNB 1602. Upon receiving the measurement report, eNB 1602 prepares other cell for RRC re-establishment at step 1615. At step 1616, UE 1601 declares RLF before handover measurement report is sent.

Figure 17:
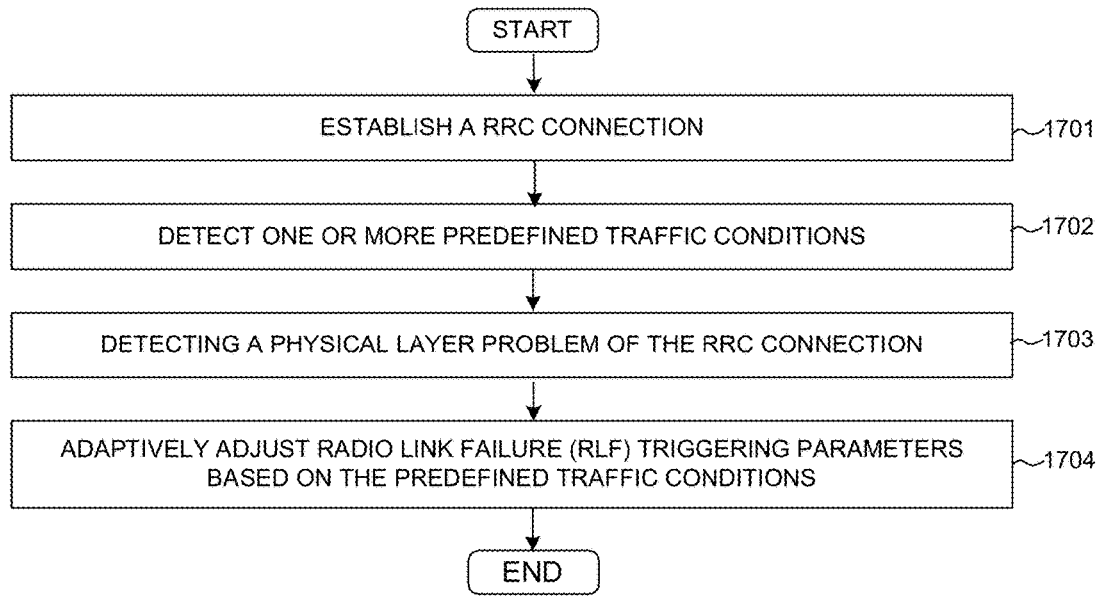
FIG. 17 is an exemplary flow chart where UE triggers RLF based on traffic conditions.

FIG. 17 is an exemplary flow chart in accordance with embodiments of the current invention where the UE triggers RLF based on traffic conditions. At step 1701, the UE establishes a RRC connection. At step 1702, the UE detects one or more predefined traffic conditions. At step 1703, the UE detects a physical layer problem of the RRC connection. At step 1704, the UE adaptively adjusts radio link failure triggering parameters based on the predefined traffic conditions.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
   applying a discontinuous reception (DRX) and/or discontinuous transmission (DTX) operation by a user equipment (UE) in a wireless network, wherein the UE is either in a current DRX state of a long DRX state or in a short DRX state;
   detecting one or more DRX state transition triggering events that would trigger a DRX state transition, wherein the DRX state transition triggering events include sending or receiving a data transmission, and an expiration of DRX state transition timer;
   detecting a plurality of traffic conditions including whether the data transmission exceeds a predefined threshold, whether buffered data for transmission exceeds the predefined threshold, whether the data transmission is for one of predefined logical channels, whether the data transmission is for a predefined logical channel group, whether the data transmission is a predefined specific uplink transmission, whether the data transmission is a predefined specific downlink transmission, whether the UE is in a non-power-saving state, and whether the logical channel is in the non-power-saving state;
   extending an inactivity timer when a plurality of the traffic conditions are met by the UE; and
   upon expiration of the inactivity timer, entering a short or long DRX cycle.

2. The method of claim 1, wherein one of the traffic conditions is a network command that prohibits the DRX state transition, and wherein the network command is based on a traffic condition report sent by the UE.

3. The method of claim 1, wherein the DRX state is the long DRX state, and wherein one of the traffic conditions that prohibits the DRX state transition is background traffic or low QoS traffic.

4. The method in claim 1, further comprising:
   dynamically adjusting the UL transmission occasion period that applies to PUCCH transmission, RACH transmission, or contention based UL transmissions.

5. The method of claim 4, wherein the UL transmission occasion period is adjusted to a longer period upon detecting at least one of the traffic conditions: the data transmission is larger than a predefined threshold volume, the data transmission is for one of predefined logical channels or one of a predefined logical channel group, and the UE or the logical channel is in a non-power-saving state.

6. The method of claim 1, further comprising:
   sending one or more traffic condition synchronization information by the UE to the wireless network by either MAC control elements or by RRC signaling.

7. The method of claim 6, wherein the traffic condition synchronization information comprises at least one of: a DRX state, a UE power-saving or non-power-saving state, a background traffic type, a low QoS traffic type, and a short DRX inactivity timer.

* * * * *